Jan. 12, 1960 H. S. VASILEVSKIS 2,921,226

APPARATUS FOR COLOR PURITY CORRECTION
IN COLOR TELEVISION RECEIVERS

Filed May 24, 1956 2 Sheets-Sheet 1

INVENTOR.
HENRY S. VASILEVSKIS
BY
[signature]
ATTORNEY

INVENTOR.
HENRY S. VASILEVSKIS
BY
Orren V. Hawkins
ATTORNEY

United States Patent Office 2,921,226

Patented Jan. 12, 1960

2,921,226

APPARATUS FOR COLOR PURITY CORRECTION IN COLOR TELEVISION RECEIVERS

Henry S. Vasilevskis, Philadelphia, Pa., assignor to Philco Corporation, Philadelphia, Pa., a corporation of Pennsylvania Application May 24, 1956, Serial No. 586,988

10 Claims. (Cl. 315—8)

This invention relates to color purity correction in any color television receiver which tends to be adversely affected by the earth's magnetic field. An example of such a color television receiver is the so-called shadow mask receiver, and while the present invention is intended for use wherever it may have useful application, it will be described with particular reference to the shadow mask receiver.

In such a color television receiver, the display device comprises a cathode ray tube having a plurality of electron guns and having an apertured mask through which the electron beams pass to impinge upon the screen which has phosphor dots thereon emissive of light of different colors. For proper color rendition, it is essential that the electron beams be properly directed and properly convergent so that at each scanning instant when an elemental area of the color image is being reproduced, the electron beams shall pass through the correct aperture of the mask and impinge on the proper phosphor dots of the screen.

Such a color television receiver is extremely sensitive to the earth's magnetic field which tends to cause displacement of the electron beams and consequent color error in the picture. Moreover, in any given location the effect of the horizontal component of the earth's magnetic field on a particular receiver is different for different positions of the receiver in relation to such field component. In the case of a receiver employing a cathode ray tube having an envelope composed of magnetic metal, the envelope acts only as a partial shield against the earth's magnetic field, and it is necessary to provide means for compensating for the adverse influences of the earth's field acting through the face of the tube. In the case of a receiver employing a cathode ray tube having a glass envelope, the requirements for auxiliary shielding or compensating means are even greater. In any case, whenever the position of the receiver is changed rotationally, the compensating means must be adjusted to compensate for the influence of the horizontal component of the earth's magnetic field.

In general, the shielding or compensating means heretofore provided to overcome the adverse influence of the earth's magnetic field on such color television receivers have been expensive, and furthermore they have been objectionable in that they usually have necessitated adjustment by a service man whenever the position of the receiver has been changed rotationally. Such prior devices have lacked provision of adjustment means accessible to the user, and a change of position of a color television receiver employing such devices usually caused impairment of convergence and incorrect positioning of the electron beams, necessitating adjustment by a service man.

One object of the present invention is to overcome the aforementioned objections of prior color correction devices, and to provide a color correction arrangement which does not disturb the convergence of the electron beams and which is adjustable by the user.

Another object of the invention is to provide a color correction arrangement which is simple in construction and therefore low in cost.

The color correction arrangement provided by this invention is characterized by the provision of a pair of coils arranged in proximity to a cathode ray tube, and the further provision of manually controllable means for effecting current flow in the coils to produce various magnetic field effects. In one embodiment of the invention, the coils are disposed on opposite sides of the flared portion of the cathode ray tube. In another embodiment of the invention, the coils encircle the flared portion of the cathode ray tube and they are arranged in crossed relation to one another. In any case, provision is made for manually controlling the current flow in the coils so as to enable change of the direction and/or strength of the resultant magnetic field produced by the coils.

The invention may be fully understood from the following detailed description in conjunction with the accompanying drawings wherein.

Figure 1:
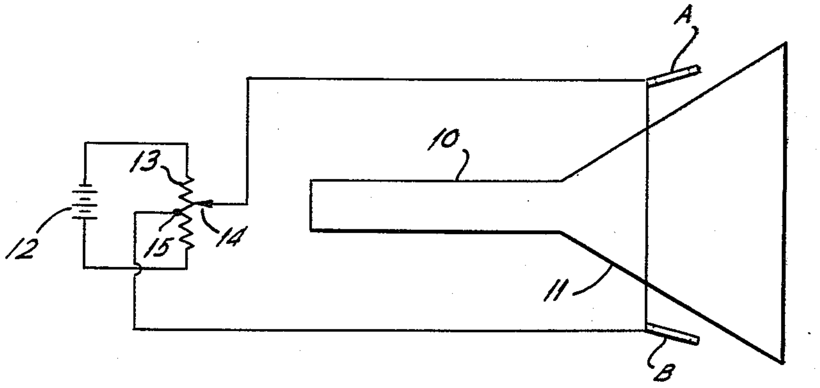
Fig. 1 is a plan view and diagrammatic illustration of a color cathode ray tube having associated therewith a pair of coils arranged in accordance with one embodiment of the present invention, and an arrangement for controlling the current in the coils.
Figure 2:
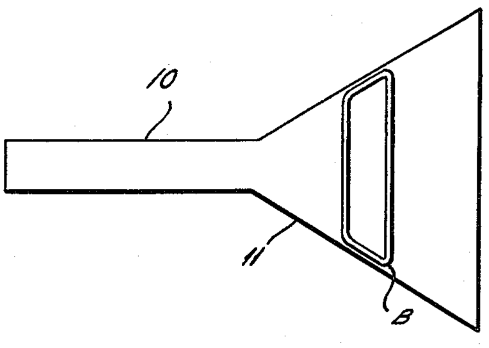
Fig. 2 is a side view of the cathode ray tube and one of the associated coils.

Referring first to Figs. 1 and 2, there is shown diagrammatically a cathode ray tube 10 which may be assumed to be of the shadow mask type, only the envelope of the tube being shown. This showing of the tube is sufficient for the present purpose, as this invention is not concerned with the internal construction and elements of the cathode ray tube which are well known. As previously mentioned, a shadow mask tube employs three electron guns, the electron beams of which must at all times be properly directed and properly convergent for accurate color rendition. The present invention is concerned with the provision of means external to the cathode ray tube for overcoming the effects of the earth's magnetic field, and for correcting color purity whenever the color television receiver is moved to a new position, without disturbing the convergence of the electron beams in the cathode ray tube.

In accordance with one embodiment of this invention as shown in Figs. 1 and 2, for the purpose of color purity correction, two coils A and B are provided on opposite sides of the flared portion 11 of the color cathode ray tube 10, and current of normally constant amplitude is supplied to the coils to produce a horizontal magnetic field which can be varied by controlling the amplitude and/or direction of the current in the coils. Thus whenever the position of the color television receiver is changed rotationally, the current supplied to the coils may be changed so as to change the strength and/or direction of the horizontal magnetic field produced by the coils and thereby readjust the color purity without impairing color convergence. In the arrangement shown in Fig. 1, current of normally constant amplitude is supplied to the two coils in series from a source 12 through a potentiometer 13 which preferably is located so as to be accessible to the user. By variously positioning the movable contact 14 in relation to fixed center tap 15, the direction and magnitude of the current in the coils may be changed at will.

It will be appreciated that the purpose of the coils A and B is to compensate for the effects of the horizontal component of the earth's magnetic field. If it is necessary to compensate for effect of the vertical component of the earth's magnetic field, similar coils may be placed above and below the cathode ray tube. However, it should be noted that in any given location the effect of the vertical component of the earth's magnetic field remains substantially constant regardless of the position of the television receiver, and does not usually require readjustment of a compensating magnetic field.

In the embodiment of Figs. 1 and 2, the coils may be of vertically elongate form, and each coil may have substantially straight parallel sides and may have upper and lower end portions conforming generally to the flare of the flared portion 11 of the cathode ray tube, as shown in Fig. 2. The vertical length of the coils may be substantially equal to the depth of the adjacent portion of the cathode ray tube. With this construction, the size of the coils may be reduced to a minimum in the interests of economy and compatibility with space limitations of the television receiver.

The coils may be mounted in any suitable manner. For example, they may be supported on the mounting rods for the cathode ray tube.

The number of turns in each coil should be such as to provide the required number of ampere turns, which generally will average about twenty.

The arrangement shown in Figs. 1 and 2 enables the use of a glass cathode ray tube without magnetic shields. moreover it enables color purity correction without impairment of the beam convergence, and therefore the adjustment for color purity correction can be made by the user.

Figure 3:
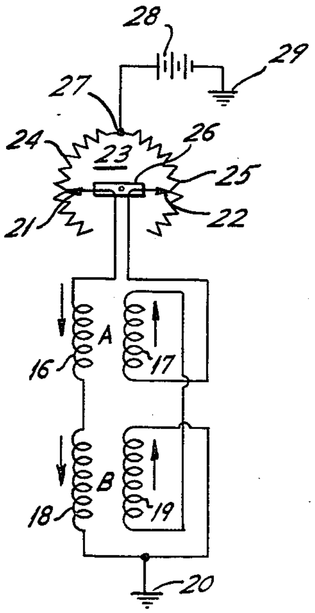
Fig. 3 is an electrical diagram showing a modified version of the coils and a circuit arrangement for controlling the current in such coils without changing the resultant impedance of the entire circuit.

In Fig. 3 there is shown another arrangement for the adjustment of the strength and/or direction of the magnetic field produced by the coils A and B. In this arrangement, coil A comprises two sections 16 and 17, and coil B similarly comprises two sections 18 and 19. Preferably the four coil sections are similar and have equal values of inductance and resistance. Sections 16 and 18 are serially connected in a circuit branch for current flow in one direction, for example in the direction indicated by the arrows associated with these coil sections. The coil sections 17 and 19 are also serially connected in a circuit branch, but the connections of these sections are reversed in relation to sections 16 and 18, for current flow in the opposite direction as indicated by the associated arrows. The two circuit branches are connected in parallel relation. Thus as shown, the lower ends of the two circuit branches are connected to ground at 20, and the upper ends of the two circuit branches are connected respectively to movable contacts 21 and 22 of a variable resistance device 23 having resistance sections 24 and 25 engaged respectively by the contacts 21 and 22. The contacts 21 and 22 are carried by a rotor 26 which may be rotationally adjusted by means of a knob (not shown). The junction point 27 of the resistance sections 24 and 25 is connected to a source of unidirectional voltage, as represented by battery 28, the other terminal of said source being grounded at 29.

With this arrangement, when the rotor 26 is adjusted substantially as shown so that there are equal resistances in the two parallel circuit branches, the currents in the two sections of each coil are equal, and since they are in opposite directions, the magnetic field components produced by the two sections effectively cancel one another. With this adjustment, which may be designated the zero adjustment, there is no resultant magnetic field produced by the coils. Suppose now that the rotor 26 is rotated clockwise from the zero adjustment shown. This will decrease the resistance of the left hand circuit branch and will increase the resistance of the right hand circuit branch. Consequently the current flow through coil sections 16 and 18 will increase, and the current through coil sections 17 and 19 will decrease. Therefore the coils will produce a resultant magnetic field having a certain direction and having a strength dependent upon the degree of clockwise rotation of the rotor 26 from the zero position. Suppose now that the rotor 26 is rotated counter-clockwise from the zero position shown. In this case the resistance of the left hand circuit branch will increase, and the resistance of the right hand circuit branch will decrease. Consequently the current in coil sections 16 and 18 will decrease, and the current in coil sections 17 and 19 will increase. Therefore the coils will now produce a resultant magnetic field having a direction opposite that of the field produced by the first-mentioned adjustment, and having a strength depending upon the degree of counter-clockwise rotation of the rotor 26.

Thus it will be seen that the arrangement of Fig. 3 enables adjustment of the current in the coil sections to produce a magnetic field of a desired direction, and also enables adjustment of the strength of the field. The main advantage of this arrangement is that the total resistance of the circuit is not changed by adjustment of the variable resistance device 23. Since the resistances of the parallel circuit branches are varied differentially, the total resistance of the circuit remains substantially constant irrespective of the adjustment of device 23.

In the physical embodiment of the two-section coils, the two sections of each coil are wound in a loop having a certain shape such as that shown in Fig. 2, and the two sections are fastened together in a single rigid coil unit, as by means of tape wrapped about the coil wires. The two coils may be disposed as shown in Figs. 1 and 2.

In the arrangement of Figs. 1 and 2, the coils A and B produce a horizontal magnetic field which is generally transverse to the axis of the cathode ray tube and which can be reversed in direction. By disposing the coils at a substantial oblique angle to the axis of the cathode ray tube, and by varying the directions of the currents in the coils, the resultant magnetic field produced by the coils can be made to take different directions.

Figure 4:
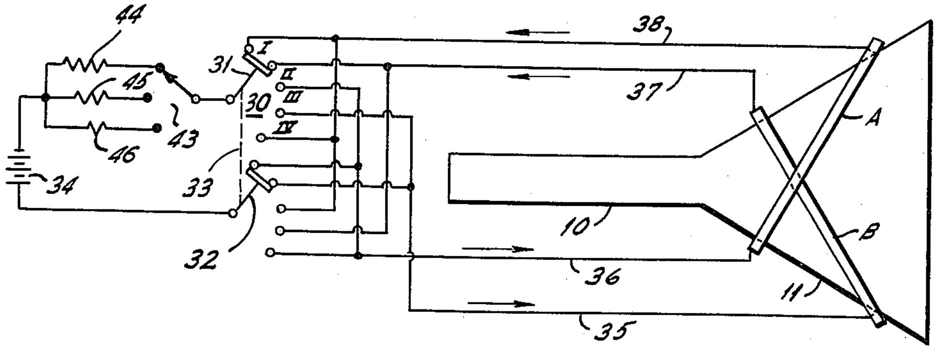
Fig. 4 is a plan view and diagrammatic illustration of another embodiment of the invention.

Fig. 4 shows an embodiment of the invention wherein the coils A and B encircle the flared portion 11 of the cathode ray tube 10, and the coils are arranged in crossed relation to one another. The coils are shaped to embrace the flared portion 11, being round or slightly elliptical for this purpose. By this arrangement, the coils produce angularly related magnetic fields and a resultant magnetic field which may be caused to take any one of a plurality of directions, as hereinafter described.

In Fig. 4 the coils A and B are connected as shown to stationary contacts of a two-pole four-position switch 30 whose movable arms 31 and 32 are interconnected, as indicated by the broken line 33, for movement in unison. Current is supplied to the coils A and B from a suitable source, such as represented at 34, through the switch 30 which preferably is located so as to be accessible to the user.

Figure 5:
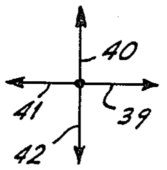
Fig. 5 is a simple vectorial illustration of the four possible magnetic field conditions obtainable by means of the arrangement of Fig. 4.

With the switch 30 in position I, as shown, current flows to and from the coils over conductors 35, 36, 37 and 38 in the directions of the arrows. With the switch in each of its other three positions II, III and IV, the relative directions of the currents in the two coils will be different. By this arrangement, it is possible to cause the resultant magnetic field produced by the two coils A and B to assume any one of four principal directions, as indicated by the four vectors 39, 40, 41 and 42 in Fig. 5. Thus whenever the color television receiver is moved rotationally to a new position, the switch 30 may be adjusted to select the direction of the resultant field produced by coils A and B which best compensates for the effects of the earth's magnetic field and thus effects color purity correction.

In order to enable adjustment of the strength of the resultant magnetic field to compensate for different strengths of the earth's magnetic field in different localities, provision may be made for changing the amplitude of the current supplied to the coils. Thus in Fig. 4 a selector switch 43 and associated attenuating resistors 44, 45 and 46 are provided to enable change of amplitude of current supplied to the coils and consequent change of the strength of the resultant magnetic field.

If it is desired to make provision for more than four directions of the resultant magnetic field produced by the coils, this may be done by making provision for relative change of the amplitudes of the currents in the respective coils, as well as the directions of such currents. One way of doing this is by providing a multi-position switch whose positions correspond to the desired directions of the resultant magnetic field, and by providing circuits including different resistances to give different relative amplitudes of the currents in the coils, as well as different relative directions of the currents, for the various positions of the switch. Another way of accomplishing the same general result is by utilizing potentiometers as shown in Fig. 6 now to be described.

Figure 6:
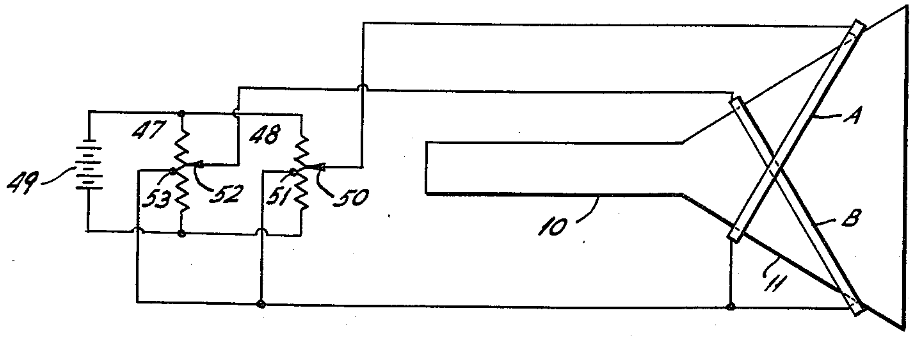
Fig. 6 is a plan view and diagrammatic illustration of another embodiment of the invention.

In Fig. 6 the crossed coils A and B are connected as shown to potentiometers 47 and 48 through which current of normally constant amplitude is supplied to the coils from a suitable source as represented at 49. By variously positioning the adjustable contact 50 of potentiometer 48 in relation to the fixed center tap 51, the direction and magnitude of current in coil A may be controlled. Similarly, by variously positioning the adjustable contact 52 of potentiometer 47 in relation to the fixed center tap 53, the direction and magnitude of the current in coil B can be controlled. By various adjustments of the potentiometers, the resultant magnetic field produced by coils A and B can be caused to have any direction and any magnitude within the range of adjustment provided by the potentiometers.

From the foregoing description of the disclosed embodiments, it will be seen that this invention provides a novel color purity correction arrangement which is characterized by the provision of a pair of coils in association with a cathode ray tube, and the provision of manually adjustable means for controlling the currents in the coils to vary the direction and/or strength of the resultant magnetic field produced by the coils.

While certain embodiments of the invention have been illustrated and described, it will be understood that the invention is not limited thereto but contemplates such modifications and other embodiments as may occur to those skilled in the art.

I claim:

1. In a color television receiver having a color image-reproducing cathode ray tube including a flared envelope portion wherein electron beam scanning of an image screen takes place to activate in sequence elemental areas of the image screen according to the color information of a received signal, and wherein electron beam displacement tends to be caused by the horizontal component of the earth's magnetic field which thus tends to produce color error in the reproduced color image, such effect being different in degree for different positions of the receiver in relation to said component, apparatus for counteracting said effect so as to maintain proper color rendition in the color image, comprising a pair of substantially planar coils disposed in vertical planes and arranged symmetrically in proximate relation to said flared envelope portion externally thereof so as to produce, in response to current flow in the coils, a magnetic field component in counteracting relation to said component of the earth's magnetic field, and means manually adjustable by the user for supplying current to said coils of direction and magnitude such that the said magnetic field component produced by the coils substantially counteracts the said component of the earth's magnetic field for different positions of the receiver in relation thereto.

2. A color television receiver according to claim 1, wherein said coils are disposed on opposite sides of said flared envelope portion.

3. A color television receiver according to claim 1, wherein said coils encircle said flared envelope portion and are arranged in crossed relation to one another.

4. In a color television receiver having a color image-reproducing cathode ray tube display device which is subject to adverse effect of the horizontal component of the earth's magnetic field tending to produce color error in the reproduced color image, such effect being different in degree for different positions of the receiver in relation to said component, apparatus for counteracting said effect so as to maintain proper color rendition in the color image, comprising a pair of substantially planar coils arranged symmetrically in proximate relation to the cathode ray tube so as to produce, in response to current flow in the coils, a magnetic field component in counteracting relation to said component of the earth's magnetic field, each of said coils having two sections, means for producing current flow of normally constant amplitude in opposite directions through the sections of each coil, whereby to produce a magnetic field of direction and strength dependent upon the relative magnitudes of the currents in the sections of each coil, and manually-operable means for varying the relative magnitudes of the currents in the sections of each coil to effect counteraction of said component of the earth's magnetic field for different positions of the receiver in relation thereto.

5. A color television receiver according to claim 4, wherein said coils are disposed in vertical planes on opposite sides of the cathode ray tube.

6. A color television receiver according to claim 4, wherein the coil sections are connected in two parallel circuit branches, one circuit branch including sections of the two coils serially connected for current flow in one direction, and the other circuit branch including sections of the two coils serially connected for current flow in the opposite direction, and wherein the current varying means comprises means for differentially varying the resistances of the two parallel circuit branches.

7. In a color television receiver having a color image-reproducing cathode ray tube display device which is subject to adverse effect of the horizontal component of the earth's magnetic field tending to produce color error in the reproduced color image, such effect being different in degree for different positions of the receiver in relation to said component, apparatus for counteracting said effect so as to maintain proper color rendition in the color image, comprising a pair of substantially planar coils encircling the cathode ray tube and arranged in crossed relation to one another so as to produce, in response to current flow in the coils, a magnetic field component in counteracting relation to said component of the earth's magnetic field, means for supplying current to said coils, and manually-operable means for varying the direction of the currents in said coils, thereby to vary the direction of the resultant magnetic field produced by the coils so as to effect counteraction of said component of the earth's magnetic field for different positions of the receiver in relation thereto.

8. A color television receiver according to claim 7, wherein said manually-operable means comprises multi-position switch means interconnected with said coils.

9. A color television receiver according to claim 8, further including manually-operable means for varying the amplitude of the current supplied to the coils.

10. A color television receiver according to claim 7, wherein said manually-operable means comprises potentiometers by which the amplitudes as well as the directions of the currents may be varied.

References Cited in the file of this patent

UNITED STATES PATENTS

| | | |
|---|---|---|
| 2,258,643 | De Grier et al. | Oct. 14, 1941 |
| 2,459,732 | Bradley | Jan. 18, 1949 |
| 2,513,221 | Webb | June 27, 1950 |
| 2,643,352 | Parker | June 23, 1953 |
| 2,663,757 | Lubcke | Dec. 22, 1953 |
| 2,675,501 | Friend | Apr. 13, 1954 |
| 2,719,249 | Friend | Sept. 27, 1955 |
| 2,816,244 | Hillegass | Dec. 10, 1957 |
| 2,825,835 | Heppner | Mar. 4, 1958 |

OTHER REFERENCES

Klemperer: "Electron Optics," Cambridge University Press, 1953, pages 126 and 127.